United States Patent [19]

Koerner

[11] Patent Number: 5,040,303

[45] Date of Patent: Aug. 20, 1991

[54] TOE ADJUSTMENT METHOD AND APPARATUS

[76] Inventor: Arthur Koerner, 3901 Waterview, Rochester, Mich. 48064

[21] Appl. No.: 492,351

[22] Filed: Mar. 8, 1990

Related U.S. Application Data

[63] Continuation of Ser. No. 175,037, Mar. 29, 1988, abandoned.

[51] Int. Cl.$^5$ .................. B01B 7/315; B25B 21/00
[52] U.S. Cl. ............................ 33/286; 33/288; 33/203.13; 33/203.12; 33/203; 81/57.14; 81/57.22; 81/57.36
[58] Field of Search ............... 33/286, 288, 203.12, 33/203.13, 203.15, 203; 81/57.14, 57.15, 57.16, 57.22, 57.25, 57.30, 57.32, 57.36, 57.41

[56] References Cited

U.S. PATENT DOCUMENTS

| | | | |
|---|---|---|---|
| 3,535,960 | 10/1970 | Borries | 81/57.14 |
| 4,376,396 | 3/1983 | Hayhoe | 81/57.14 |
| 4,443,951 | 4/1984 | Elsasser et al. | 33/203.13 |
| 4,674,366 | 6/1987 | Lauer et al. | 81/51.14 |
| 4,679,327 | 7/1987 | Fouchey et al. | 33/203.13 |

Primary Examiner—William A. Cuchlinski, Jr.
Assistant Examiner—William C. Dowling
Attorney, Agent, or Firm—Reising, Ethington, Barnard, Perry & Milton

[57] ABSTRACT

Toe adjustment apparatus for an alignment machine includes wheel position and body height sensors for providing input to a controller, and a power wrench carried by an adjustment mechanism for engaging and adjusting the vehicle tie rod under control of the controller. Power operated multi-axis actuators approximately align and couple the wrench head with the tie rod and multi-axis passive adjustments perfect registration of the head on the tie rod. The wrench head includes an open end socket configured to mate with a jam nut at one end and a tie rod hex portion at the other end so that both elements are selectively engaged by lateral shifting along the rod from one to the other for turning the jam nut and the rod as required for proper toe set. An encoder on the wrench produces pulses representing rotation increments and thus wheel adjustment increments. A method of correcting toe angle comprises measuring the toe angle and determining the error, calculating the rotation target value require to correct the error, adjusting the tie rod with the wrench and counting the encoder pulses, and comparing the counted pulses with the target value to determine when to stop adjustment.

14 Claims, 5 Drawing Sheets

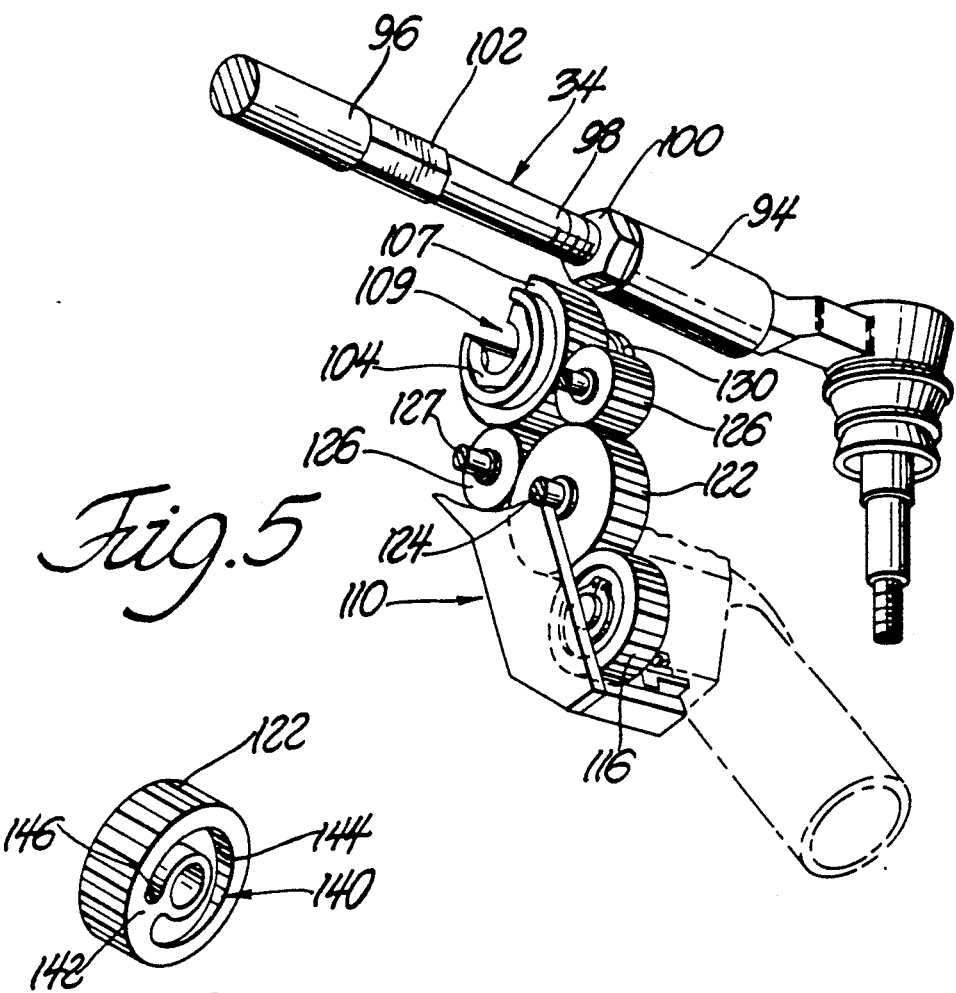
Fig. 5
Fig. 5A
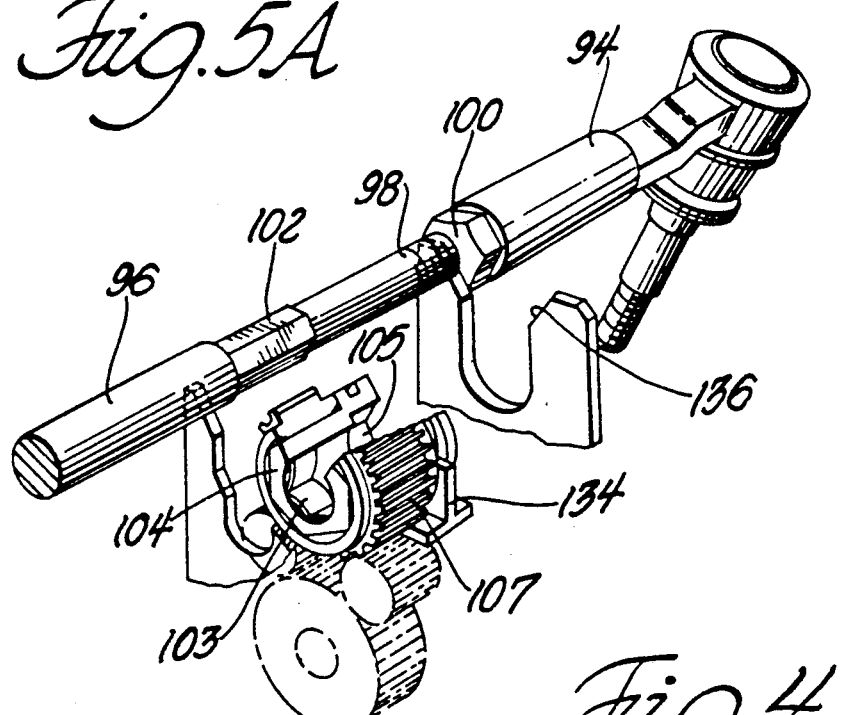
Fig. 4

TOE ADJUSTMENT METHOD AND APPARATUS

This application is a continuation of application Ser. No. 175,037, filed Mar. 29, 1988 and now abandoned.

FIELD OF THE INVENTION

This invention relates to automatic toe adjustment method and apparatus for a wheel alignment machine and particularly to such toe adjustment method and apparatus utilizing a power wrench for tie rod nut adjustment.

BACKGROUND OF THE INVENTION

In the manufacture of automotive vehicles automatic equipment plays an important role in accurate and inexpensive assembly and adjustment of the vehicle components. One of the operations where such automatic equipment has been employed is in the toe adjustment of wheels during wheel alignment. As a matter of design, each vehicle type has an assigned toe angle which is parallel to the longitudinal axis or at a small angle to the axis. To provide an adjustment capability, the tie rod has a threaded adjustment allowing relative rotation of male and female shaft members to cause lengthening or shortening of the tie rod, and a jam nut on the threaded part to lock the assembly against relative rotation. An adjustment machine then must be capable of measuring the toe angle and alternately rotating the jam nut and one of the shaft members for making any needed correction to a high degree of accuracy. The machine then is required to make the measurement and then, without exact information on the location of the tie rod, quickly make the adjustment by finding the tie rod, securely attaching a wrench to the jam nut and the shaft, and rapidly making the proper rotation of each part.

U.S. Pat. No. 4,679,327 to Fouchey et al discloses a toe set alignment system having a track for positioning a vehicle over a pit, adjustment apparatus in the pit, an apparatus for measuring the toe set, a sensor for detecting the vehicle height, and a programmable controller for reading the measurements and controlling the adjustment apparatus. The adjustment apparatus has a mechanism carried on a guideway for positioning relative to the tie rod and an adjustment head having drive rollers for contacting and adjusting the tie rod. A separate nut runner head is used to operate the jam nut. To use the nut runner the adjustment head must first be removed from the tie rod and then, as a separate operation, the nut runner is applied, thereby adding extra time to the adjustment.

SUMMARY OF THE INVENTION

It is therefore an object of the invention to provide a toe adjustment method and apparatus for an alignment machine that can rapidly make a tie rod adjustment and tighten the jam nut. It is another object to provide an apparatus to perform those functions without removing the adjusting mechanism from the tie rod.

The invention is carried out in a wheel alignment machine having measurement means for determining wheel attitude and a programmable controller for machine control, automatic toe adjustment means for engaging a tie rod and controllably turning a threaded tie rod part and an associated jam nut comprising; a power wrench having an open end head for fitting on the tie rod, the head having a first side conforming to the jam nut and a second side configured to drive the tie rod part, and multi-axis support means under control of the controller for holding the power wrench and for moving it into engagement with the tie rod, the support means including means for laterally shifting the power wrench head in one direction along the tie rod axis for selectively engaging and turning one of the nut and the tie rod part, and for laterally shifting the wrench head in the opposite axial direction for engaging and turning the other nut or part. The invention further comprehends an encoder coupled to the wrench to measure the amount of corrective rotation for use in determining the completion of the adjustment.

The invention is further carried out in a wheel alignment machine having a tie rod rotating apparatus for adjusting toe angle by the method comprising the steps of; measuring the toe angle, determining the required correction, calculating a target rotation amount, adjusting the angle by rotating the tie rod, measuring the actual rotation amount during the adjusting step, comparing the measured rotation amount with the target rotation amount, and stopping the adjusting when the measured rotation amount equals the target rotation amount, whereby the adjustment is made rapidly and accurately.

BRIEF DESCRIPTION OF THE DRAWINGS

The above and other advantages of the invention will become more apparent from the following description taken in conjunction with the accompanying drawings wherein like references refer to like parts and wherein:

FIGS. 4 and 5 are partly broken away isometric views of a power wrench according to the invention;

FIG. 5A is an isometric view of a gear in the wrench head;

DESCRIPTION OF THE PREFERRED EMBODIMENT

Figure 1:
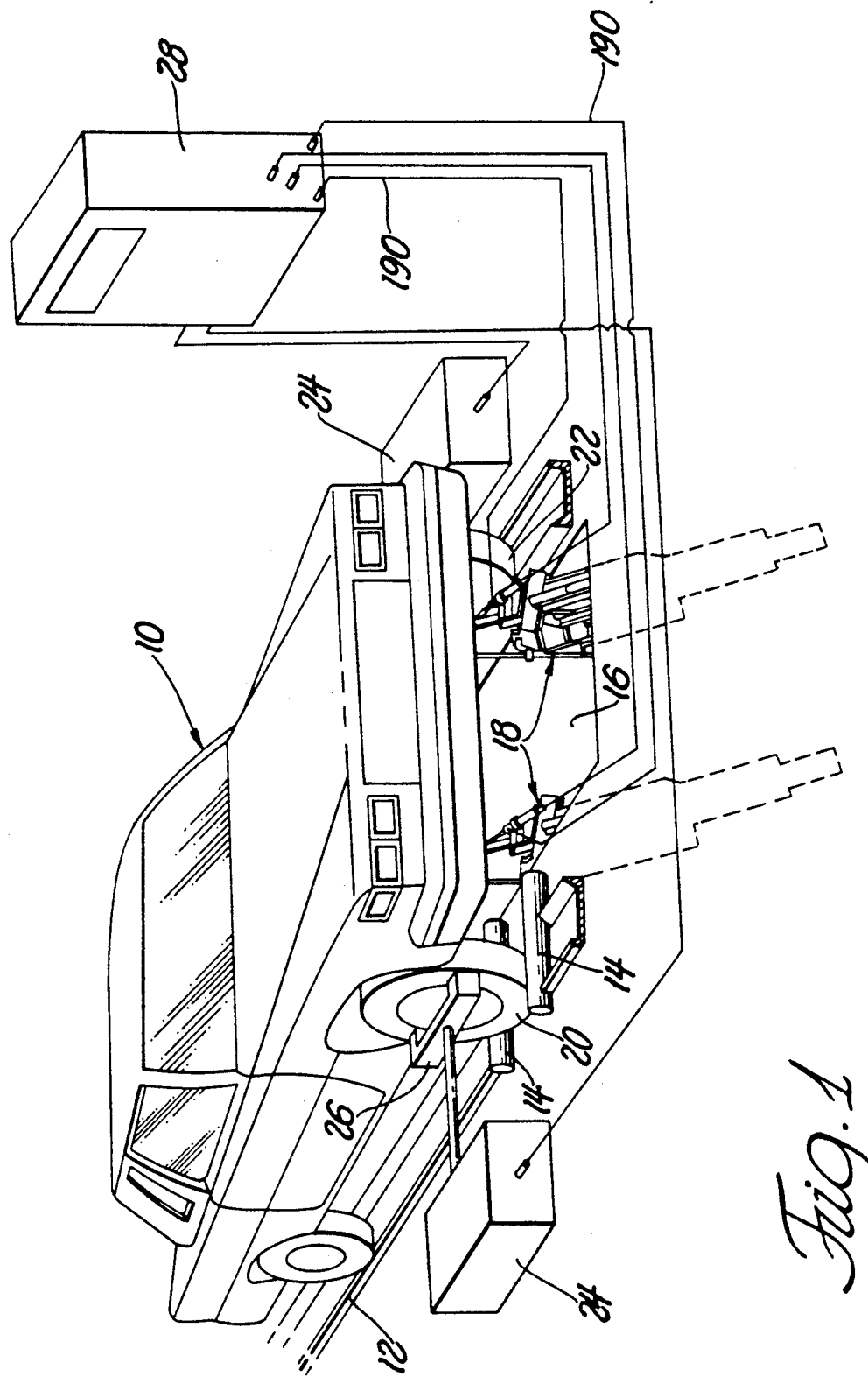
FIG. 1 is a perspective view of a vehicle at an alignment station having a toe adjustment apparatus according to the invention.

FIG. 1 depicts a vehicle 10 on a positioning track 12 including stops 14 for establishing fore and aft position, a pit 16 between the tracks 12 and under the vehicle 10 for accommodating two toe adjustment mechanisms 18, one for the right wheel 20 and one for the left wheel 22. The wheels are rotated by a conventional arrangement wherein the stops 14 are rollers supporting the respective wheel and one of which is motor driven. A wheel attitude sensing device 24 at each wheel 20 and 22 includes a wheel engaging probe 26 for determining the respective wheel position. The devices 24 are coupled to a programmable controller 28 which assesses the wheel position information and issues correction signals to the adjustment mechanism 18. As thus far described, the system and its operation are well known and further details are not necessary except as follows.

Figure 2:
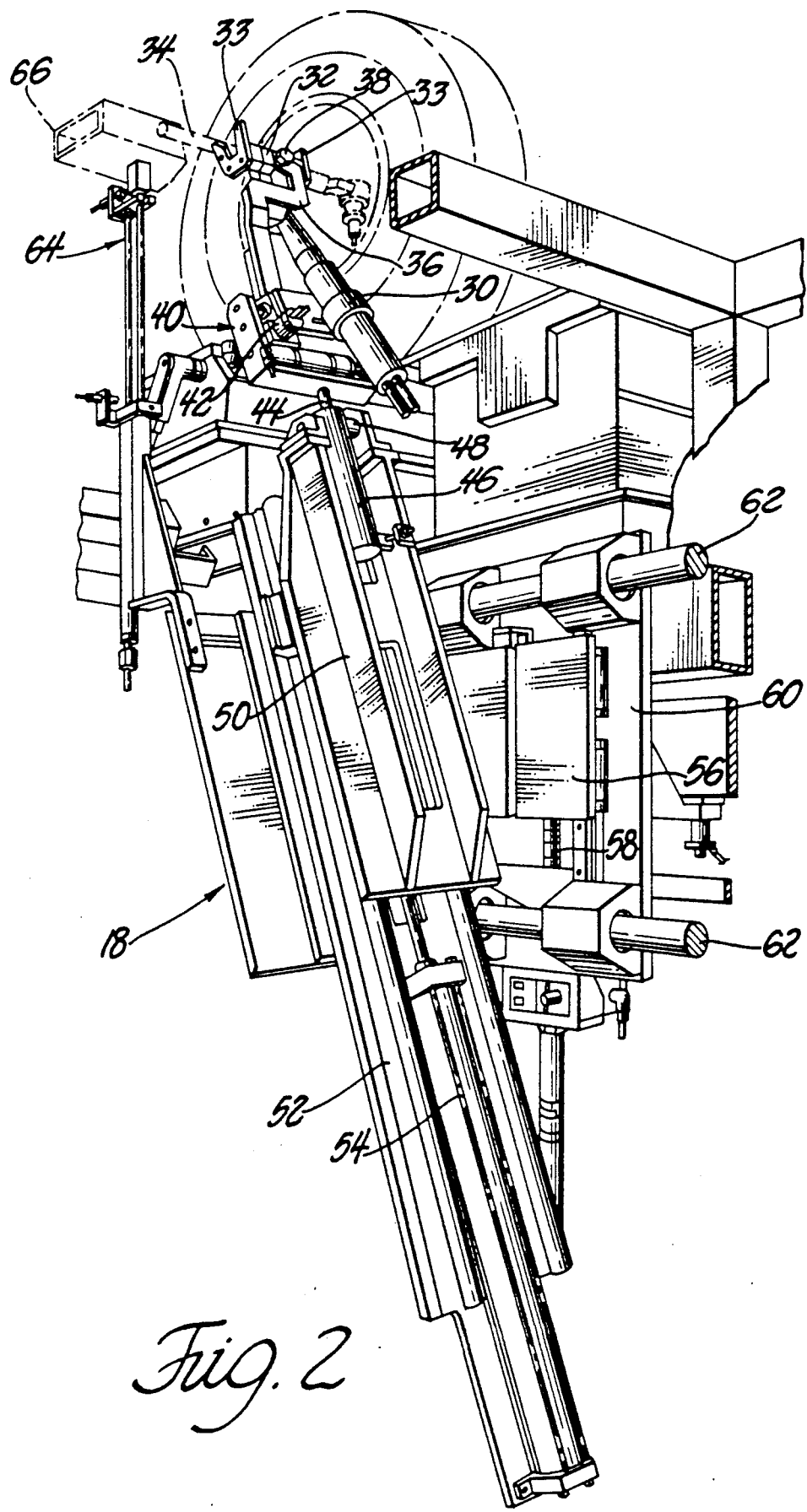
FIG. 2 is a perspective view of a toe adjustment mechanism according to the invention.

FIG. 2 shows the adjusting mechanism which comprises a power wrench 30 having a head 32 mounted on supporting mechanism. The wrench 30 is movable toward and away from a tie rod 34 and all the supporting mechanism is devoted to providing that motion in a way to assure accurate engagement of the wrench head 32 with the tie rod. To facilitate the engagement a locating fork 33 is provided at each end of the head 32 for guiding the head toward the tie rod 34. The head 32 is coupled to a bracket 36 by a pivot connection 38 which allows the head to self adjust about one axis upon contacting the tie rod. The bracket 36, in turn, is attached to a transverse carrier 40 having a motor 42 for adjustably positioning the bracket 36 and thus the head 32 in a direction generally parallel to the tie rod. A shaft 44 carried in a spring cylinder 46 is attached to the transverse carrier 40. A pivot pin 48 generally parallel to the tie rod secures the spring cylinder 46 to a slide 50 and permits limited rocking movement of the cylinder about the axis of the pin 48. The cylinder 46 itself permits limited rotation about the shaft 44 axis as will be further described. The slide 50 is slidably mounted on an inclined guideway 52 and is moved toward and away from the tie rod by a linear actuator 54. The guideway 52 is attached to a movable vertical carrier 56 which is positioned by a motor driven lead screw 58. The vertical support 56 assembly is mounted on a horizontal carrier 60 which is movable on rails 62 parallel to the vehicle longitudinal axis. A probe 64 carried by the guideway 52 is extendable upwardly to engage a cross member 66 on the vehicle to judge the vehicle height and relay that information to the controller 28.

In operation, the horizontal carrier 60 is prepositioned to suit the particular vehicle model to be aligned. The vehicle 10 is moved onto the track 12 with the front wheels against the stops 14. The probes 26 are moved into position against the wheels 20, 22 to gauge the lateral position of the wheels relative to the track 12 as well as to sense each wheel angular attitude. Underneath the vehicle, the height probe gauges the height of the vehicle cross member 66. Since manufacturing tolerances lead to different vehicle heights, even in the same model, and the height affects the position of the tie rod, the height information is useful in the automatic location process. The position information from probes 26 and 64 is fed to the controller 28 which causes the appropriate positioning of the vertical carrier 56 and the transverse carrier 40, so that the wrench head 32 is approximately aligned with the tie rod 34. Then the slide 50 can be advanced to carry the head to the tie rod. During engagement of the head with the tie rod the locating forks 33 guide the head for accurate and firm seating of the head. Movement about three axes to accommodate any small misalignment is permitted by the passive pivot connections 38 and 48 and by the rotation offered by the spring cylinder 46.

Figure 3:
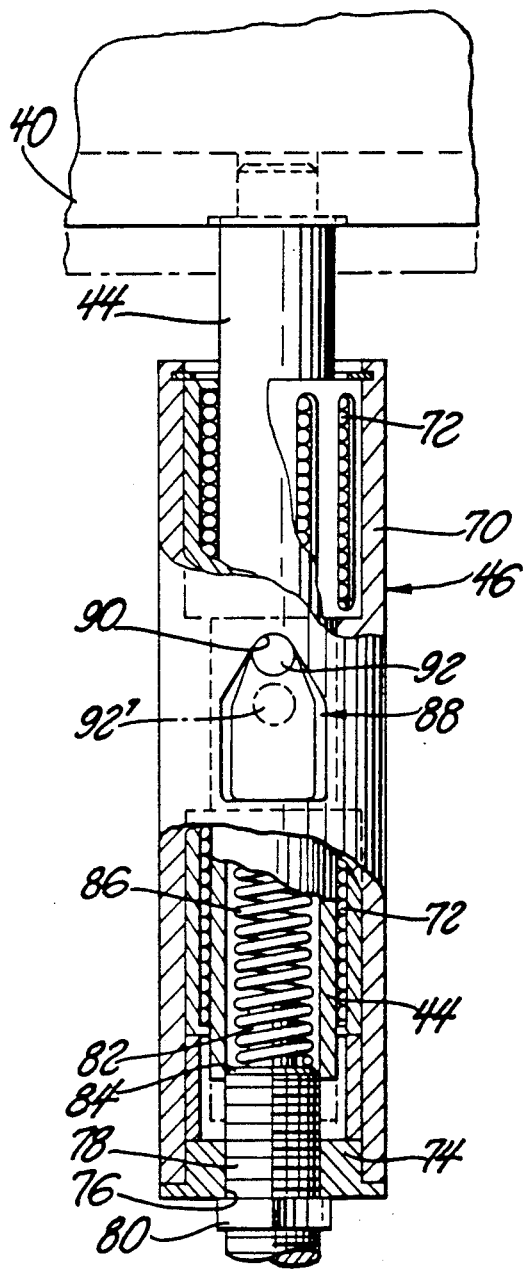
FIG. 3 is a partly broken away sectional view of a spring biased cylinder for support of the power wrench according to the invention.

Referring to FIG. 3, the spring cylinder 46 comprises a tubular housing 70 containing a set of bearings 72 at either end to slidably support the shaft 44 for axial movement. The lower end of the housing 70 has a closure 74 with a threaded central aperture 76 which receives a threaded plug 78 secured by a lock nut 80. The plug 78 has an inner end 82 of reduced diameter which defines a shoulder 84. The inner end 82 serves as a spring locator and the shoulder 84 is a seat for a coiled compression spring 86. The shaft 44 is hollow at its lower end and receives the spring 86 and the inner end of the plug 78 which is adjustable to adjust the spring force which serves to thrust the shaft 44 upwardly. A cam aperture 88 in the side of the housing 70 has a triangular portion with its apex 90 directed upwardly and with its base adjoining a square portion of the aperture. A pin 92 threaded into the side of the shaft 44 extends into the cam aperture 88 and is normally pressed into the apex by the spring force to establish the normal angular position of the shaft 44. When, during engagement of the head against the tie rod 34, sufficient axial force is applied to compress the spring 86 the shaft moves to a depressed position to withdraw the pin 92 from the apex 90 to a less restrictive position 92' shown in phantom lines. Then the shaft can rotate about its axis a limited amount to accommodate a small misalignment of the head and the tie rod. Thus the cylinder 46 and shaft 44 arrangement allows lost motion during the forceful application of the head to the tie rod and maintains a predetermined angular disposition of the head about the shaft axis until the lost motion occurs.

The tie rod itself as well as the wrench head details are shown in FIGS. 4 and 5. The tie rod 34 has a threaded coupling comprising a knuckle 94 with a threaded female part, a rod 96 with a threaded end 98 received in the knuckle 94, a jam nut 100 on the rod 96 for locking the threaded parts against relative rotation, and a hex shaped portion 102 on the rod spaced from the knuckle 94. The tie rod 34 is lengthened or shortened by loosening the jam nut, turning the rod 96 in the knuckle 94, and tightening the jam nut 100. The head 32 of the power wrench 30 is designed to engage the rod 96 in a space between the threaded end 98 and the hex portion 102 and accomplish the operations on both the shaft 96 and the nut 100 while remaining engaged with the rod 96.

Figure 6:
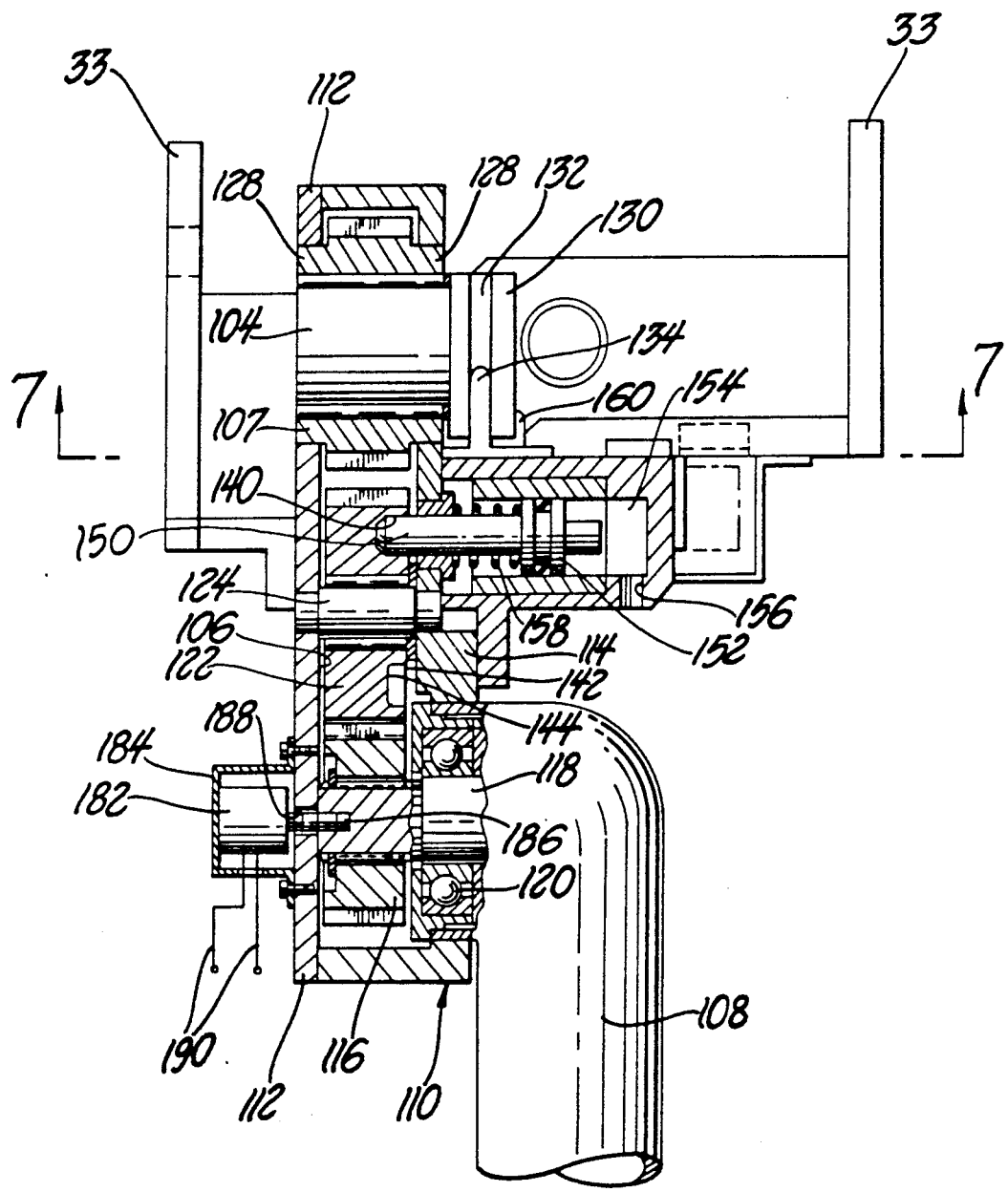
FIG. 6 is a partly broken away elevation of the wrench of FIGS. 4 and 5.

As best seen in FIGS. 4 through 6, the wrench head 32 has an open end socket 104 with two spaced, coaxial socket cavities. One cavity 103 is configured to fit the hex part 102 and the other cavity 105 is formed to fit the jam nut 100. Thus the same head is used for rotating both parts and is merely shifted laterally to selectively engage them. The socket 104 has a hex shaped outer surface and is loosely held in a gear 107 having a hex cavity and an end opening 109 aligned with the socket end opening. The gear 107 is driven through a special gear train 106 by a conventional pneumatic power tool driver 108. The gear train is enclosed in a housing 110 which includes a pair of side plates 112 and 114 which support the gears. The gear train 106 has a driving gear 116 directly driven by the tool driver 108 which has an output shaft 118 journaled in a bearing assembly 120. An intermediate gear 122 meshes with the driving gear 116 and is rotatably mounted on a pin 124 which is mounted by its end in apertures in the side plates 112, 114. Two pinions 126, journaled on pins 127, mesh with the intermediate gear 122 as well as with the gear 107 to drive the socket 104. As the gear 107 turns about its axis the pinions 126 will, one at a time, encounter the opening in the gear so that at least one pinion will be in driving relation to the gear 107. The gear 107 has laterally extending hubs 128 journaled in the plates 112, 114. The plates cannot completely encompass the hubs 128 due to the necessary open end feature, but they do wrap around the hubs enough to retain the gear 107. A hub extension 130 on one side of the socket 104 has an annular groove 132 mating with a stationary guide 134 to prevent lateral movement of the socket 104. The locating forks 33 are mounted as outriggers on either side of the socket 104 and are spaced so that as the socket is applied to the rod between the jam nut 98 and the hex portion 102 one fork 33 will engage the knuckle 94 and the other will engage the rod 96. Each fork has a flared opening 136 to catch the rod when the head approaches the rod and terminates in a seat 138 tailored to the size of the part that it engages. The opening of each fork 33 faces the same direction as the opening of the socket when in its index position.

Figure 7:
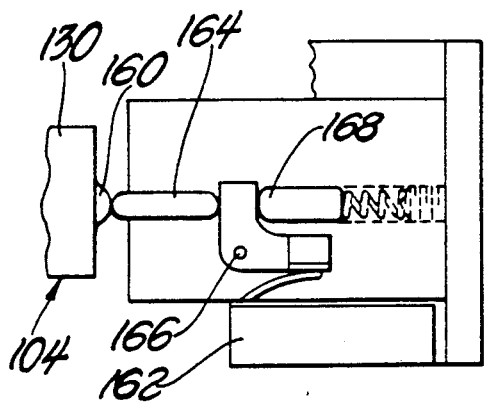
FIG. 7 is a View of a wrench detail as viewed along line 7—7 of FIG. 6.
Figure 8:
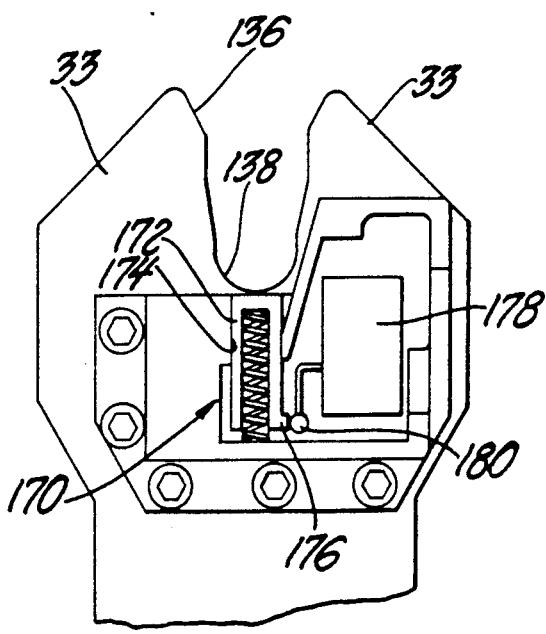
FIG. 8 is a side elevation of the wrench according to the invention.

Provision is made for assuring that the socket 104 stops at its index position to allow the engagement and disengagement with the tie rod. As shown in FIGS. 5A and 6 the intermediate gear 122 has an arcuate groove 140 in one face 142 which has a bottom ramp 144 to define an abutment 146 at the lowest end of the ramp while the other end of the ramp terminates flush with the face 142. A stop pin 150 is positioned to move axially into the groove 140. The pin carries a piston 152 which slidably fits within a cylinder 154 mounted on the side plate 114 opposite the gear 122. An opening 156 in the cylinder for connection to an air pressure line, not shown, provides for admitting pressure to force the pin 150 into the groove 140. A spring 158 surrounding part of the pin 150 and bearing against the piston urges the pin out of the groove 140 in the absence of the air pressure. A cam 160 carried on an end of the socket 10 helps to stop the socket at its index position by operating a switch 162 (FIG. 7) which signals the socket position to the controller 28 which can then remove power to the wrench at an appropriate time to stop. The cam operates the switch 162 through a linkage comprising a slidable pin 164 which follows the cam 160, a bell crank 166 which translates the pin 164 movement to the switch 162 operating arm, and a spring biased pin 168 in line with and opposed to the pin 164 to bias the linkage toward switch off position.

In operation of the indexing feature, the socket is initially in the index position prior to engaging the tie rod 34 so that the open end of the socket 104 allows entry of the rod. Then under control of the controller 28, air pressure is removed from the cylinder 154 to permit the stop pin 150 to retract from the groove 140. To assure that the pin has indeed withdrawn, the wrench motor is initially driven in a direction that rotates the gear 122 such that the ramp 144 pushes the pin 150 out of the groove. Then the socket may be rotated in either direction. To remove the head from the rod 96 the controller causes the gear 122 to slowly rotate opposite to the initial direction, apply air pressure to the cylinder 154 to drive the pin 150 into the groove 140, and remove power when the switch 162 is operated. The pin 150 contacts the abutment 146 to positively stop the gear at the index position to allow withdrawal of the head.

A sensor 170 in the head 32 determines when the head has made engagement with the rod 96. A pin 172 spring biased outwardly toward the rod 96 slides in a bore 174 so that the presence of the rod determines the position of the pin 172. The pin has a laterally projecting shoulder 176 at one end. A switch 178 has an operating arm 180 in the path of the shoulder 176 so that the switch 178 is actuated by the shoulder 176 when the head moves against the rod 94. The signal from this switch informs the controller 28 when to apply power to the wrench.

Still another sensor for supplying information to the controller 28 is a rotary optical encoder 182 secured to the plate 112 on the head and covered by a housing 184. The encoder 182 has an input shaft 186 extending through an aperture 188 in the plate 112 and threaded into the end of the wrench driving shaft 118 for rotation by the shaft 118. The encoder input shaft 186 rotates whenever the wrench head rotates and produces output pulses on lines 190 marking increments of rotation. The rotation of the tie rod part 96 changes the toe angle by an amount proportional to the amount of rotation. The exact relationship depends on the geometry of the steering linkage, the thread size, and other factors, but for a given system the wrench rotation and thus the number of encoder pulses during an adjustment interval is directly related to the change in toe angle. A typical system has an encoder which yields 82 counts per revolution of the encoder input shaft and the corresponding wrench rotation effects a toe angle change of 0.62 degrees. Thus 0.01 degree is equivalent to 1.32258 counts. Resolution of this sort is appropriate since wheel toe angle specifications require accuracy within a few hundredths of a degree.

Overall operation of the automatic toe adjustment apparatus comprises positioning the vehicle on the track 12, applying the wheel probes 26 and the height sensor 64 to determine the vehicle position, adjusting the vertical position of the support 56 and the lateral position of the head 32 via the transverse carrier 40, and operating the slide 50 from its idle retracted position to its extended position to engage the rod 96 by the head 32. The sensor 170 determines the time of engagement and the controller uses that information to arrest the upward slide movement. The powered adjustments align the head with the rod 96 well enough for the locating forks 33 to find the rod and the pivot connections 38 and 48 and the spring cylinder 46 allow passive adjustments for exact alignment as the slide 50 moves to its final position. Then the wrench is moved laterally by the transverse carrier 40 to engage the socket portion 105 with the jam nut 100, the socket being turned slowly to obtain registration and coupling with the nut. The nut is loosened to allow free adjustment of the rod 96 in the knuckle 94. Then the head is shifted in the same way to engage the hex part 102 and the rod is turned under control of the controller to lengthen or shorten the tie rod 34 until the toe specification is met. Then the head is moved back to the jam nut 100 to tighten it and is then moved to a neutral position on the rod 96 where the socket is indexed for removal from the rod and the slide 50 is retracted.

The apparatus will operate in two modes: static and dynamic. In each mode toe angle is measured by rotating the wheel and averaging hundreds of angle measurements and the error is calculated by comparison with the angle specification. Thus the true toe angle is not available instantaneously. The static mode is a closed loop system wherein the wheel is stopped after the measurement is made and the static wheel attitude is constantly measured during tie rod adjustment and the adjustment continues until the wheel is moved an amount equal to the error.

In the dynamic mode, the rotary encoder is used to provide adjustment information to the controller. An error is calculated in terms of the number of encoder pulses needed to correct the error and the encoder pulses are counted to determine when to stop the adjustment. The wheel continues to rotate during the adjustment and a verifying measurement is made after the adjustment. If necessary, another adjustment is made. More particularly, the dynamic mode operates as follows: the toe angle is measured, the error is calculated, the necessary correction value or target rotation amount is calculated in terms of the required number of encoder pulses, the power wrench turns the rod to make the adjustment, the encoder measures the rotary displacement of the wrench (in terms of encoder pulses), the rotation is compared to the target rotation amount and the wrench rotation is stopped when the rotation equals the correction value or target amount.

It will thus be seen that the apparatus of the invention is an improvement over prior proposals particularly in its ability to use the same wrench part to turn the jam nut and the rod without removal of the wrench from the rod, its superior self adjustment mechanisms for accurate and secure coupling of the wrench with the tie rod, and its ability to provide adjustment feedback to the controller. Likewise, the method of the invention affords the ability to accomplish accurate adjustments using encoded feedback from the adjusting mechanism.

The embodiments of the invention in which an exclusive property or privilege is claimed are defined as follows:

1. In a wheel alignment machine having measurement means for determining wheel attitude and a programmable controller for machine control, automatic toe adjustment means for engaging a tie rod and controllably turning a threaded tie rod part and an associated jam nut comprising;
   a power wrench having an open end head for fitting on the tie rod, the head having a first side conforming to the jam nut and a second side configured to grip the tie rod part, and
   multi-axis support means under control of the controller for holding the power wrench and for moving it into engagement with the tie rod, the support means including means for laterally shifting the power wrench head in one direction along the tie rod axis for selectively engaging and turning one of the nut and the tie rod part, and for laterally shifting the wrench head in the opposite axial direction for engaging and turning the other one of the nut and the tie rod part.

2. The invention as defined in claim 1 wherein the power wrench includes a gear train for driving the head and means for indexing the open end head to a home position for engaging and disengaging the tie rod comprising;
   a gear in the gear train having an arcuate cam on one face, the cam having an abutment on one end,
   a movable stop member for selectively engaging the cam so that when engaged the stop member contacts the abutment in the home position to stop the head.

3. The invention as defined in claim 2 wherein the means for indexing the open end head to a home position includes a second cam on the head and switch means operated by the second cam for producing a power stop signal when the head approaches home position so that wrench power can be removed at an appropriate point in the head rotation.

4. The invention as defined in claim 2 wherein the arcuate cam comprises a ramped groove in a face of the gear extending from the abutment at one end of the groove to the face at the other end so that the stop member selectively engages the abutment upon gear rotation in one direction and is cammed out of the groove upon gear rotation in the other direction.

5. The invention as defined in claim 1 wherein the power wrench head carries locating means effective during movement into engagement with the tie rod for guiding the head into alignment with the tie rod.

6. The invention as defined in claim 5 wherein the locating means comprises a fork on either side of the head, each fork having a flared opening for locating the tie rod and guiding the head into alignment with the tie rod, and passive multi-axis pivot means for supporting he power wrench and allowing the head to seat on the tie rod.

7. The invention as defined in claim 1 wherein the power wrench head carries locating means effective during pressing movement against the tie rod for guiding the head into alignment with the tie rod, and spring biased cylinder means for supporting the power wrench and allowing lost motion between a normal position and a depressed position, the cylinder means having a rotation axis generally normal to the tie rod for allowing head rotation when the head is pressed against the tie rod and the cylinder means is in a depressed position, and the cylinder means including cam means for holding the head in a predetermined rotary position when the cylinder means is in normal position.

8. The invention as defined in claim 7 wherein the cylinder means comprises a cylindrical housing, a shaft axially movable in the housing between the said normal and depressed positions, spring means for biasing the shaft toward the normal position, and a cam comprising an aperture in the housing and a pin in the shaft extending into the aperture for constraining the movement of the shaft, the aperture being shaped to limit the shaft to a given rotary position when the shaft is in normal position and to allow some degree of rotation when in depressed position.

9. The invention as defined in claim 1 wherein the power wrench includes an encoder for measuring wrench rotation during turning of the tie rod part and for furnishing an output signal to the controller.

10. A wheel alignment machine comprising:
    measurement means for determining wheel attitude,
    automatic wheel attitude adjustment means for engaging and controllably turing an adjustable member for adjusting said wheel attitude,
    a rotary encoder coupled to the adjustment means for monitoring the actual number of rotations of the adjustable member for determining the actual correction of wheel attitude,
    a programmable controller having inputs from the measurement means and from the rotary encoder, said controller including means responsive to sad measurement means for determining the total number of rotations of the adjustable member for obtaining a desired correction of wheel attitude, and means for comparing the total number of rotations for the desired correction with the actual number of rotations of actual correction, and means for controlling the adjustment means,
    the adjustment means including a power wrench adapted to engage the adjustable member, said power wrench being controlled by the controller to turn the adjustable member until the actual correction is equal to the desired correction.

11. The invention as defined in claim 10 wherein the power wrench has a rotary part which rotates in proportion to the attitude correction and the encoder is drivingly connected to the rotary part to produce an electrical signal having a parameter corresponding to the toe angle correction.

12. The method of adjusting toe angle using a wheel alignment machine having a tie rod rotating apparatus for adjusting toe angle, said method comprising the steps of:
  measuring the toe angle while the wheel is rotating,
  determining the required correction of the toe angle,
  calculating a target rotation amount required for the tie rod rotation apparatus to obtain the required correction,
  adjusting the toe angle while the wheel is rotating by rotating the tie rod by the tie rod rotation apparatus, p1 measuring the actual rotation amount of the tie rod rotation apparatus during the adjusting step,
  comparing the measured rotation amount wit the target rotation amount, and
  stopping the adjusting when the measured rotation amount equals the target rotation amount, whereby the adjustment is made rapidly and accurately.

13. The method of adjusting toe angle using a wheel alignment machine having a power wrench for adjusting toe angle by rotating a tie rod having a rotatable wrench engageable adjustment portion and a jam nut axially spaced from the adjustment portion to lock the rod against rotation, said method comprising the steps of,
  applying the power wrench to the tie rod between the jam nut and the adjustment portion,
  measuring the toe angle,
  producing a wrench control signal in response to the measured angle,
  shifting the wrench axially along the rod to engage the adjustment portion,
  rotating the wrench under control of the wrench control signal to adjust the tie rod until a correct toe angle is obtained,
  shifting the wrench axially along the rod without removal of the wrench from the rod to engage the jam nut, and
  rotating the wrench to tighten the jam nut, thereby locking the adjustment portion against further adjustment.

14. The invention as defined in claim 13 wherein the measuring step includes determining the required correction, and the signal producing step comprises;
  calculating a target rotation amount,
  measuring the actual rotation amount during the adjusting step,
  comparing the measured rotation amount with the target rotation amount, and
  stopping the adjusting when the measured rotation amount equals the target rotation amount, whereby the adjustment is made rapidly and accurately.

* * * * *